(12) United States Patent
Abbasfar

(10) Patent No.: US 8,159,376 B2
(45) Date of Patent: Apr. 17, 2012

(54) ENCODING AND DECODING TECHNIQUES FOR BANDWIDTH-EFFICIENT COMMUNICATION

(75) Inventor: Aliazam Abbasfar, Sunnyvale, CA (US)

(73) Assignee: Rambus Inc., Sunnyvale, CA (US)

( * ) Notice: Subject to any disclaimer, the term of this patent is extended or adjusted under 35 U.S.C. 154(b) by 130 days.

(21) Appl. No.: 12/744,547

(22) PCT Filed: Oct. 9, 2008

(86) PCT No.: PCT/US2008/079411
§ 371 (c)(1),
(2), (4) Date: May 25, 2010

(87) PCT Pub. No.: WO2009/075936
PCT Pub. Date: Jun. 18, 2009

(65) Prior Publication Data
US 2010/0265109 A1    Oct. 21, 2010

Related U.S. Application Data

(60) Provisional application No. 61/012,294, filed on Dec. 7, 2007.

(51) Int. Cl.
*H03M 5/00* (2006.01)
(52) U.S. Cl. .................................................. 341/58
(58) Field of Classification Search ............... 341/58, 341/59
See application file for complete search history.

(56) References Cited

U.S. PATENT DOCUMENTS

| | | | | |
|---|---|---|---|---|
| 5,734,341 A * | 3/1998 | Walker | ............................ | 341/95 |
| 5,825,824 A * | 10/1998 | Lee et al. | ...................... | 375/292 |
| 2002/0114268 A1 | 8/2002 | Kim | | |
| 2003/0071745 A1 * | 4/2003 | Greenstreet | ..................... | 341/58 |
| 2004/0135709 A1 * | 7/2004 | Cornelius et al. | .............. | 341/58 |
| 2005/0129133 A1 | 6/2005 | Liu | | |

* cited by examiner

*Primary Examiner* — Howard Williams
(74) *Attorney, Agent, or Firm* — Park, Vaughan, Fleming & Dowler LLP

(57) ABSTRACT

An encoder encodes data into parallel codewords. Each codeword is expressed as a set of logic 0s and a set of logic 1s on two sets of output nodes. The encoder selects a current codeword which differs from the immediately preceding codeword by a fixed number of zero-to-one transitions on the first set of nodes and a fixed number of one-to-zero transitions on the second set of nodes. The current codeword is selected such that the first and second sets of nodes are different than additional nodes that contain transitions between the immediately preceding codeword and a bi-preceding codeword, and that logic values on additional nodes are unchanged between immediately preceding codeword and current codeword. A decoder decodes the codewords by comparing symbols on node pairs other than those for which transitions were expressed in the preceding code word, and decoding the results of those comparisons.

29 Claims, 11 Drawing Sheets

ENCODING AND DECODING TECHNIQUES FOR BANDWIDTH-EFFICIENT COMMUNICATION

TECHNICAL FIELD

Digital communication systems convey data over one or more conductors as varying voltages or currents that represent the data as series of symbols. Over a single wire, for example, relatively low and high voltages can be used to represent a logic '0' and a logic '1,' respectively. The bandwidth of a given communication channel is generally limited by the speed at which the channel can transition between different types of symbols (e.g., between relatively high and low voltages). The time required to transition between symbols varies with symbol patterns, making it difficult to identify symbol boundaries at high data rates.

Communication systems are designed to accommodate some amount of variation in transition timing. The tolerance of a communication system to such variations is called the 'timing margin.' In general, increased timing margins provide greater noise tolerance and, as a consequence, higher speed performance and increased communication bandwidth. Therefore, there is a demand for techniques that increase timing margins.

BRIEF DESCRIPTION OF THE FIGURES

FIG. 2 is a waveform diagram illustrating how an embodiment of encoder of FIG. 1 implements the coding technique of Table 1 to encode a sequence of two-symbol data patterns DQ[1:0] into a series of parallel symbol sets S[5:0] to be conveyed on links a through f.

DETAILED DESCRIPTION

Figure 1:
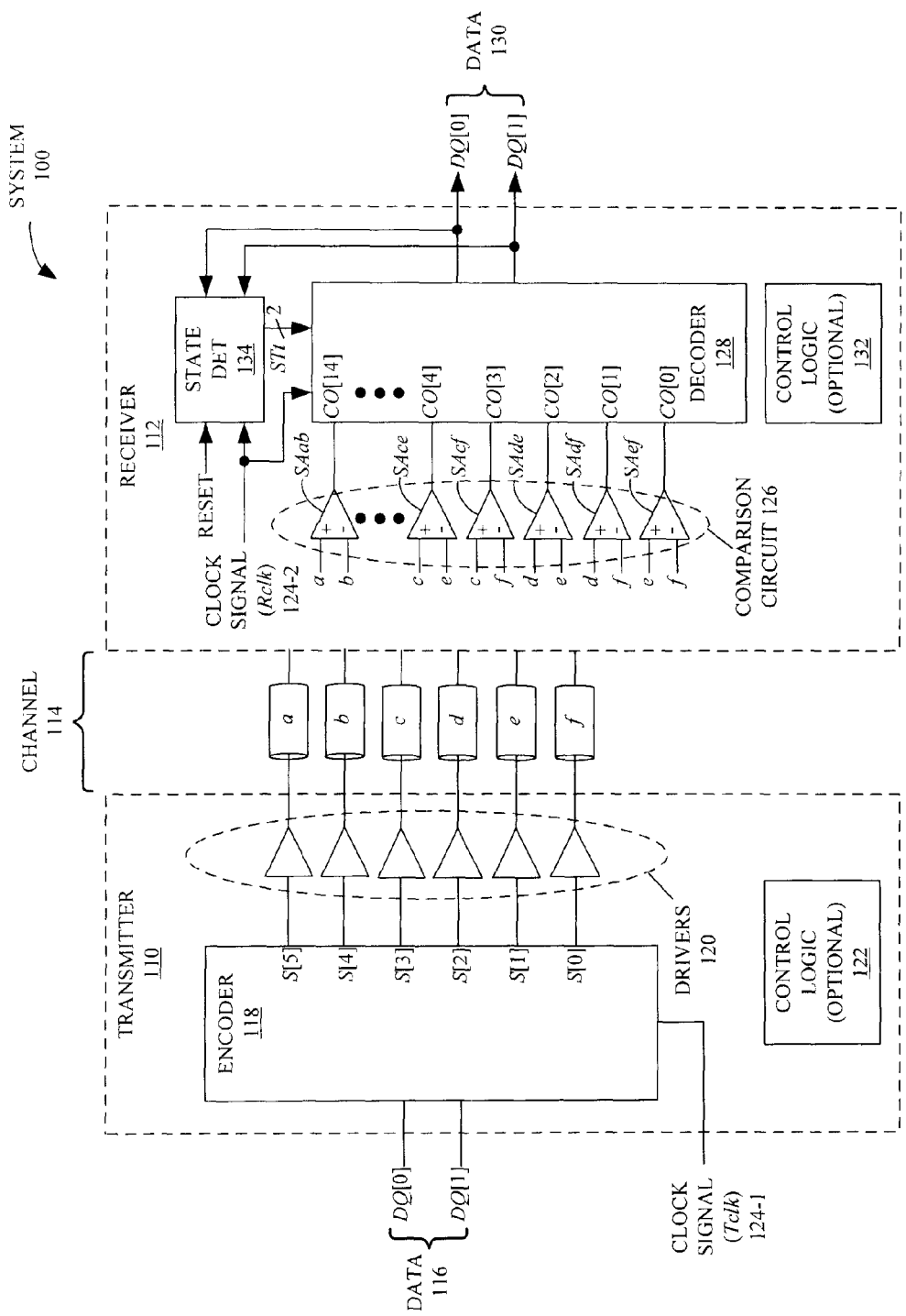
FIG. 1 is a block diagram illustrating a system that encodes and decodes two-bit data DQ[1:0] in accordance with one embodiment.

FIG. 1 presents a block diagram illustrating a system 100 that includes a transmitter 110 and a receiver 112 connected by a communication channel 114. An encoder 118 encodes two-bit data DQ[1:0] 116 into a series of parallel symbols S[5:0] in codewords for transmission over corresponding links a, b, c, d, e and f of the channel. Each codeword is expressed as two sets of like symbols S[5:0], one representing logic 0s on a first three links (e.g., S[5:3]=000 on links a, b and c of channel 114) and another representing logic is on the remaining three links (e.g., S[2:0]=111 on links d, e and f). Encoder 118 encodes each codeword in relation to the two immediately preceding codewords. The codewords in a collection of three adjacent codewords are uniquely identified herein, from youngest to eldest, as a current codeword, a preceding codeword, and a 'bi-preceding' codeword.

Encoder 118 selects a current codeword such that it differs from the preceding codeword by a fixed number of zero-to-one transitions on the first three links and a fixed number of one-to-zero transitions on the remaining three links. Moreover, the current codeword is selected such that the links that transition between the preceding and current codeword did not transition between the bi-preceding and preceding codewords, and the links that did transition between the bi-preceding and preceding codewords do not transition in the current codeword. In the example in which the bi-preceding codeword S[5:0] is 011001 and the preceding codeword S[5:0] is 001011, the two bit data DQ[1:0] 116 can be encoded into the current codeword as one of the following four possibilities: 000111, 001110, 100011 or 101010.

A comparison circuit 126 in receiver 112 compares the symbols on each pair of links a, b, c, d, e and f using a set of fifteen sense amplifiers SA, the outputs of which are conveyed to a decoder 128 as signals CO[14:0]. Most of the sense amplifiers and corresponding outputs are omitted for brevity. The decoder decodes the outputs from comparison circuit 126 by considering only those sense amplifiers that did not receive a transition in the preceding time interval (i.e., those sense amplifiers whose outputs did not transition between the bi-preceding and preceding codewords). As described further below, because these sense amplifiers experience approximately zero intersymbol interference, limiting consideration to that subset of the sense amplifiers considerably increases the timing margin for received data, and consequently supports improved speed performance and increased communication bandwidth.

Encoder 118 receives two-bit data DQ[1:0] on edges of an internal or external transmit clock signal TClk 124-1. The resulting codewords S[5:0] are provided as analog or digital signals by drivers 120 onto links a through f. In a typical example, transmitter 110 and receiver 112 are on respective integrated circuits (ICs), such as a memory controller IC and a memory device IC. The following discussion refers to elements a through f alternatively as 'links' or 'nodes.' The former refers to the entire AC- or DC-coupled signal path between encoder 118 and comparison circuit 126, whereas the latter refers to an input or output pin, wire, or terminal.

Comparison circuit 126 includes fifteen sense amplifiers SA in this example. The label for each sense amplifier includes two lowercase characters to that correspond to the compared input nodes. For example, sense amplifier SAab compares input nodes a and b from like-named links of channel 114. Decoder 128 samples the outputs from comparison circuit 126 on edges of a receive clock signal RClk 124-2 and decodes the resultant sample sets to recover data 130. As described further below, state detector 134 identifies the preceding codeword and those nodes or links in the preceding codeword that had transitions. The state detector 134 may provide this information or may provide the codewords for the two immediately preceding codewords (the bi-preceding and preceding codewords) from data 130 in the two preceding time intervals (which specifies the nodes or links in the preceding codeword that has transitions). In either case, state detector 134 identifies the sense amplifiers in comparison circuit 126 that received transitions in the preceding codeword. Decoder 128 uses the identified state STt to resolve the next codeword.

Control logic 122 and 132 are optionally included on respective transmitter 110 and receiver 112 to initialize encoding and decoding processes. For example, the initialization may involve a handshake procedure in which the receiver 112 confirms that the state of the channel 114 is known prior to normal operation. Additionally, during the initialization mode of operation, optional control logic 132 may place state detector 134 in a known state by asserting reset signal RESET prior to the transmission of a predetermined sequence of symbols sets by transmitter 110. The optional control logic 122 and 132 can communicate via a separate command interface (not shown).

received, encoder 118 selects each current codeword such that that nodes that transition between the preceding and current codewords did not transition between the bi-preceding and preceding codewords. Based on these coding constraints between three temporally adjacent codewords, the instant embodiment provides four possible codewords for each current time interval. In the example of Table 2, if the bi-preceding codeword S[5:0] is 011001 and the preceding codeword S[5:0] is 001011, the two bit data DQ[1:0] 116 can be encoded into the current codeword as one of the following four possibilities: 000111 (DQ[1:0] 116 of 00), 001110 (DQ[1:0] 116 of 01), 100011 (DQ[1:0] 116 of 10) or 101010 (DQ[1:0] 116 of 11). In general, encoder 118 can encode the current codeword based on the preceding codeword and the nodes in the preceding codeword that include transitions relative to the bi-preceding codeword.

TABLE 1

| Codeword Number (CW#) | Codeword S[5:0] for links a b c d e f | Comparison Circuit 126 Outputs a−b \| a−c \| a−d \| a−e \| a−f \| b−c \| b−d \| b−e \| b−f \| c−d \| c−e \| c−f \| d−e \| d−f \| e−f |
|---|---|---|
| 1  | 1 1 1 0 0 0 | x \| x \| 1 \| 1 \| 1 \| 1 \| x \| 1 \| 1 \| 1 \| 1 \| 1 \| 1 \| x \| x \| x |
| 2  | 1 1 0 1 0 0 | x \| 1 \| x \| 1 \| 1 \| 1 \| 1 \| x \| 1 \| 1 \| 0 \| x \| x \| 1 \| 1 \| x |
| 3  | 1 1 0 0 1 0 | x \| 1 \| 1 \| x \| 1 \| 1 \| 1 \| 1 \| x \| 1 \| x \| 0 \| x \| 0 \| x \| 1 |
| 4  | 1 1 0 0 0 1 | x \| 1 \| 1 \| 1 \| x \| 1 \| 1 \| 1 \| 1 \| x \| x \| x \| 0 \| x \| 0 \| 0 |
| 5  | 1 0 1 1 0 0 | 1 \| x \| x \| 1 \| 1 \| 1 \| 0 \| 0 \| x \| x \| x \| 1 \| 1 \| 1 \| 1 \| x |
| 6  | 1 0 1 0 1 0 | 1 \| x \| 1 \| x \| 1 \| 0 \| x \| 0 \| x \| 1 \| x \| 1 \| 0 \| x \| 1 |
| 7  | 1 0 1 0 0 1 | 1 \| x \| 1 \| 1 \| 1 \| x \| 0 \| x \| x \| 0 \| 1 \| 1 \| 1 \| x \| x \| 0 \| 0 |
| 8  | 1 0 0 1 1 0 | 1 \| 1 \| x \| 1 \| 1 \| x \| 0 \| 0 \| x \| 0 \| 0 \| x \| x \| 1 \| 1 \| 1 |
| 9  | 1 0 0 1 0 1 | 1 \| 1 \| 1 \| x \| 1 \| 1 \| x \| x \| 0 \| x \| 0 \| 0 \| x \| 0 \| 1 \| 1 \| x \| 0 |
| 10 | 1 0 0 0 1 1 | 1 \| 1 \| 1 \| 1 \| x \| 1 \| x \| x \| x \| 1 \| 0 \| 0 \| x \| 0 \| 0 \| 0 \| x |
| 11 | 0 1 1 1 0 0 | 0 \| 0 \| 0 \| x \| x \| x \| 1 \| 1 \| 1 \| x \| 1 \| 1 \| 1 \| 1 \| 1 \| x |
| 12 | 0 1 1 0 1 0 | 0 \| 0 \| x \| 0 \| x \| x \| 1 \| x \| 1 \| 1 \| x \| 1 \| 1 \| 0 \| x \| 1 |
| 13 | 0 1 1 0 0 1 | 0 \| 0 \| x \| x \| 0 \| x \| 1 \| 1 \| x \| 1 \| 1 \| 1 \| x \| x \| 0 \| 0 |
| 14 | 0 1 0 1 1 0 | 0 \| x \| 0 \| 0 \| x \| 1 \| x \| x \| 1 \| 0 \| 0 \| x \| x \| 1 \| 1 \| 1 |
| 15 | 0 1 0 1 0 1 | 0 \| x \| 0 \| x \| 0 \| 1 \| x \| 1 \| x \| 0 \| x \| 0 \| 1 \| 1 \| x \| 0 |
| 16 | 0 1 0 0 1 1 | 0 \| x \| x \| 0 \| 0 \| 1 \| 1 \| x \| x \| x \| 0 \| 0 \| 0 \| 0 \| x |
| 17 | 0 0 1 1 1 0 | x \| 0 \| 0 \| 0 \| x \| 0 \| 0 \| 0 \| x \| x \| x \| 1 \| x \| 1 \| 1 \| 1 |
| 18 | 0 0 1 1 0 1 | x \| 0 \| 0 \| x \| 0 \| 0 \| 0 \| x \| 0 \| x \| 1 \| x \| 1 \| x \| 0 |
| 19 | 0 0 1 0 1 1 | x \| 0 \| x \| 0 \| 0 \| 0 \| x \| 0 \| 0 \| 0 \| x \| x \| 0 \| 0 \| x |
| 20 | 0 0 0 1 1 1 | x \| x \| 0 \| 0 \| 0 \| x \| 0 \| 0 \| 0 \| 0 \| 0 \| x \| x \| x |

TABLE 2

| Codeword S[5:0] for links a b c d e f | Comparison Circuit 126 Outputs | | | | | |
|---|---|---|---|---|---|---|
| 0 1 1 0 0 1 | SAac = 0 | SAad = x | SAaf = 0 | SAcd = 1 | SAcf = x | SAdf = 0 |
| 0 0 1 0 1 1 | SAac = 0 | SAad = x | SAaf = 0 | SAcd = 1 | SAcf = x | SAdf = 0 |
| 0 0 0 1 1 1 | SAac = x | SAad = 0 | SAaf = 0 | SAcd = 0 | SAcf = 0 | SAdf = x |
| 0 0 1 1 1 0 | SAac = 0 | SAad = 0 | SAaf = x | SAcd = x | SAcf = 1 | SAdf = 1 |
| 1 0 0 0 1 1 | SAac = 1 | SAad = 1 | SAaf = x | SAcd = x | SAcf = 0 | SAdf = 0 |
| 1 0 1 0 1 0 | SAac = x | SAad = 1 | SAaf = 1 | SAcd = 1 | SAcf = 1 | SAdf = x |

Table 1 illustrates a codespace with twenty balanced codewords, which have an equal number of 0s and 1s, and which may be communicated using six links or nodes. Symbols on the nodes for each codeword can be divided into two sets of three, a first set of three nodes with symbols that represent logic 0s and a second set of three nodes with symbols that represent logic 1s. For each pair of temporally adjacent codewords selected from this codespace, there are a fixed number of one-to-zero transitions in the first set of three nodes, and a fixed number of zero-to-one transitions in the second set of three nodes. Moreover, for each two bits of data DQ[1:0] 116

As illustrated in Table 1, each of sense amplifiers SA in comparison circuit 126 can have one of three output values. Using the rightmost column, for example, sense amplifier SAef, which receives symbols on input nodes e and f, outputs:
1. a voltage representative of a logic 0 (e.g., a negative voltage−Vp) when symbols S[1] and S[0] on respective input nodes e and f express logic values of 0 and 1, respectively;
2. a voltage representative of a logic 1 (e.g., a positive voltage+Vp) when input nodes e and f express logic values of 1 and 0, respectively; and 3. an intermediate voltage (e.g., a voltage Vint) represented by an 'x', when input nodes e and f express like logic values (i.e., are both 1 or both 0).

Each codeword of Table 1 causes six pairs of sense amplifiers to output the intermediate voltage Vint and the remaining nine to output a positive or negative voltage±Vp. Decoder 128 can decode the outputs from the sense amplifiers to recover the encoded two-bit data DQ[1:0] 130.

However, by excluding those nodes that had transitions between the two immediately preceding codewords (which, per the encoding technique, do not include transitions in the current codeword), the current codeword can be decoded by comparing symbols on a subset of the pairs of nodes selected from the first set of three nodes and the second set of three nodes (which can be identified based on the state STt). In the example of Table 2, in which there is one one-to-zero transition and one zero-to-one transition between temporally adjacent codewords, transitions to the current codeword can only occur on two of the four nodes that did not transition between the two immediately preceding codewords. In the example in which the bi-preceding and preceding codewords are 011001 and 001011, respectively, the second and fifth nodes, which correspond to links b and e, transition between the codewords that precede the current codeword. For reasons detailed below in connection with FIG. 2, the current codeword can be decoded using comparisons of just two pairings of these nodes. This approach may be used to significantly reduce the number of sense amplifiers SA in comparison circuit 126.

Moreover, changing the output of the sense amplifiers between temporally adjacent codewords from the intermediate voltage Vint (for the preceding codeword) to ±Vp (for the current codeword) take less time than the more extreme transitions between positive and negative voltages −Vp and +Vp. Consequently, if decoder 128 decodes the outputs from the sense amplifiers that transitioned between voltage Vint and ±Vp to recover the encoded two-bit data DQ[1:0] 130, the timing margin of system 100 will be increased over similar differential systems. Increased timing margin advantageously facilitates increased data rates, increased bandwidth, reduced noise sensitivity, or combinations of these parameters. In the example, of Table 2, sense amplifiers SAad and SAcf can be used to decode the current codeword with zero intersymbol interference.

Figure 2:
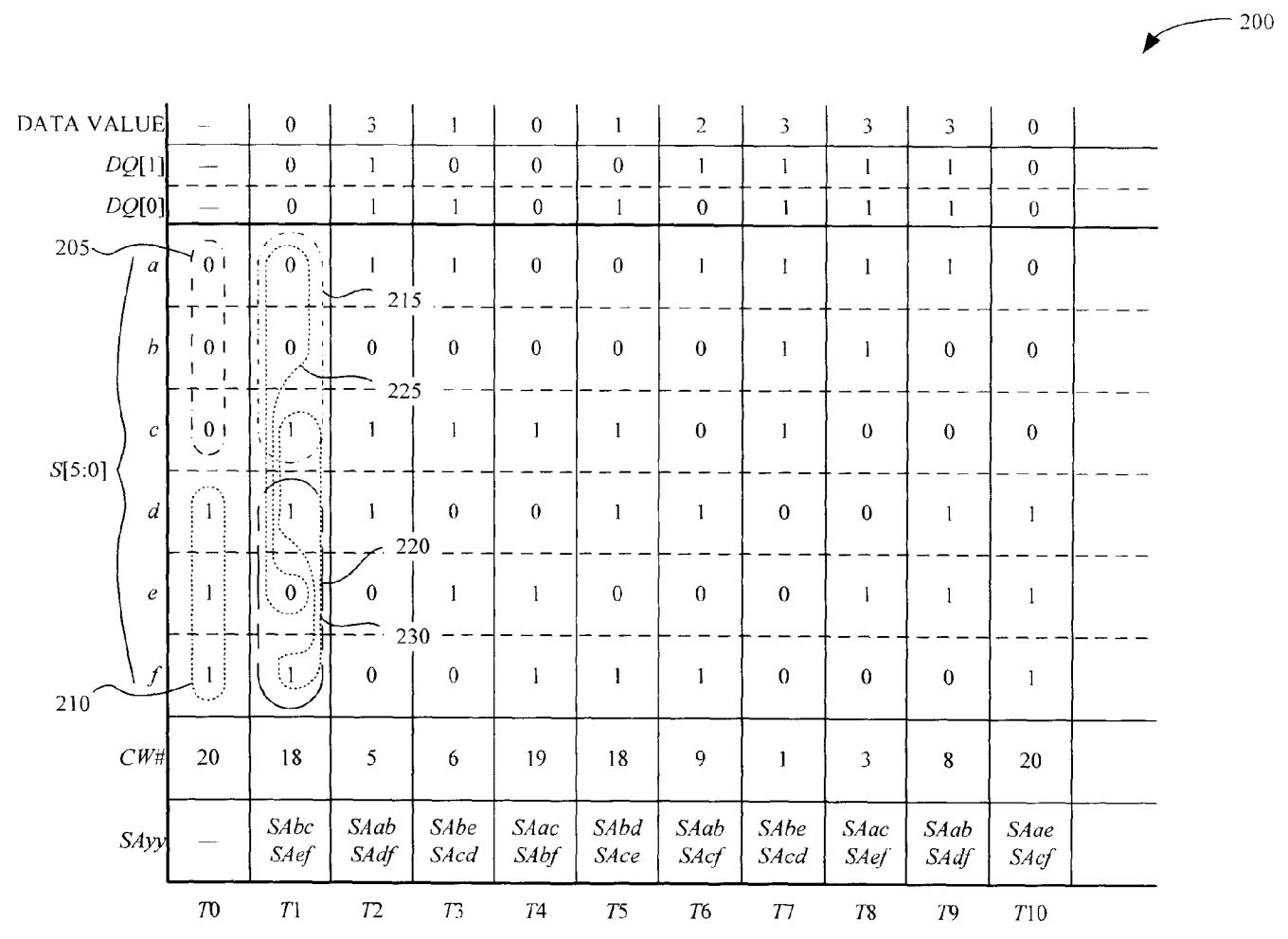

FIG. 2 presents a waveform diagram 200 illustrating how an embodiment of encoder 118 (FIG. 1) implements the coding technique of Table 1 to encode a sequence of two-symbol data patterns DQ[1:0] 116 (FIG. 1) into a series of parallel symbol sets S[5:0] for transmission across a six-link channel. This encoding and decoding technique improves timing and voltage margins, and consequently affords improved speed performance, bandwidth, noise tolerance or combinations of these parameters over similar differential systems.

As noted previously, the bit positions of symbols S[5:0] correspond to respective links a, b, c, d, e and f (e.g., S[5] is the logic value expressed on link a). The encoding technique encodes each successive codeword based upon the preceding codeword, and the transitions between the preceding codeword and the bi-preceding codeword. In the series of time intervals T0-T10 of FIG. 2, this information for codewords in two adjacent time intervals are used to encode subsequent data DQ[1:0] into a subsequent codeword S[5:0] in the next time interval.

Beginning at time T0, a predetermined codeword, in this case codeword zero, which is expressed as symbols S[5:0]=000111, is transmitted. The use of a predetermined codeword allows decoder 128 (FIG. 1) to begin decoding in a known state, which is important for reasons noted below. Per Table 1, encoder 118 (FIG. 1) divides the symbols of the current time interval T0 into two sets of symbols, a first symbol set 205 representing logic 0s on a first set of nodes (coupled to links a, b and c) and a second symbol set 210 representing logic 1s on a second set of nodes (coupled to links d, e and f). Encoder 118 (FIG. 1) encodes the subsequent codeword at time interval T1 such that one symbol on the first set of nodes (links a, b and c) transitions from 0 to 1 and one symbol on the second set of nodes (links d, e and f) transitions from a 1 to a 0. Moreover, in this encoding it is assumed that transitions occurred on links a and d in the predetermined codeword at time interval T0. Therefore, encoder 118 (FIG. 1) encodes the subsequent codeword at time interval T1 such that one symbol on links b and c transitions from 0 to 1 and one symbol on links d and f transitions from a 1 to a 0.

The encoding technique does not use the same codeword for successive time intervals. Per Table 1, the four possible values of data DQ[1:0] 116 (FIG. 1) can be expressed using one of four possible codewords. In this example, data DQ[1:0] is 00 in interval T1, which translates into codeword eighteen, or 001101. More generally, an incoming data pattern is encoded into a current codeword such that the current codeword is expressed as a third symbol set 215 on the first set of links {a, b, c} and a fourth symbol set 220 on the second set of links {d, e, f} defined by the codeword from time interval T0 and the links in this codeword that have transitions. In this example, there is one zero-to-one transition in the third symbol set 215 and one one-to-zero transition in the fourth symbol set 220. The encoding technique can be extended to different codespaces in which there are a fixed number (other than one) of zero-to-one transition in the third symbol set 215 and one-to-zero transition in the fourth symbol set 220.

In creating the current codeword at time interval T2 (i.e., the preceding time interval is T1 and the bi-preceding time interval is T0), the first set of nodes (or links) becomes nodes 225 associated with links a, b and e (all at logic 0) and the second set of nodes becomes nodes 230 associated with links c, d and f (all at logic 1). The next codeword at time interval T3 is encoded such that one symbol in each of first and second symbol sets 225 and 230 transitions but that these transitions do not occur on nodes c or e. Each subsequent codeword is similarly encoded in a manner that ensures that the collection of nodes exhibiting 0s and the collection of nodes exhibiting 1s in the preceding time interval each include a mixed set of 0s and 1s in the current interval. As a consequence of the encoding scheme, each set of data DQ[1:0] is encoded on nodes that did not transition between the bi-preceding and preceding codewords.

Because data is encoded on nodes that did not transition between the preceding two codewords, the decoder can ignore nodes that transitioned between the two preceding codewords. Moreover, the decoder can eliminate intersymbol interference by using sense amplifiers that had both inputs at the same level in the preceding time interval. At time interval T2, for example, the sense amplifiers that had both inputs at the same level in the preceding time interval are SAab, SAae, SAbe, SAcd, SAcf, and SAdf. The decoder can ignore transitions associated with nodes c and e, however, because those nodes transitioned between intervals T0 and T1 (i.e., between the bi-preceding and preceding codewords). The decoder thus need only consider the outputs from sense amplifiers whose comparisons omit nodes c and e, which are sense amplifiers SAab and SAdf. In other words, the decoder only considers the outputs of sense amplifiers for which both input nodes were at the same level for two preceding codewords.

In FIG. 2, the row SAyy identifies which two sense amplifiers in receiver 112 (FIG. 1) have both input terminals coupled to nodes that failed to transition between the two immediately preceding codewords and which had inputs at the same level (00 or 11) for the preceding codeword. The absence of a recent transition on the input terminals of these sense amplifiers dramatically reduces the effects of intersymbol interference. State STt (FIG. 1), which can identify these sense amplifiers, can be derived by state detector 134 based on the preceding codeword and the transitions between the preceding codeword and the bi-preceding codeword.

Figure 3A:
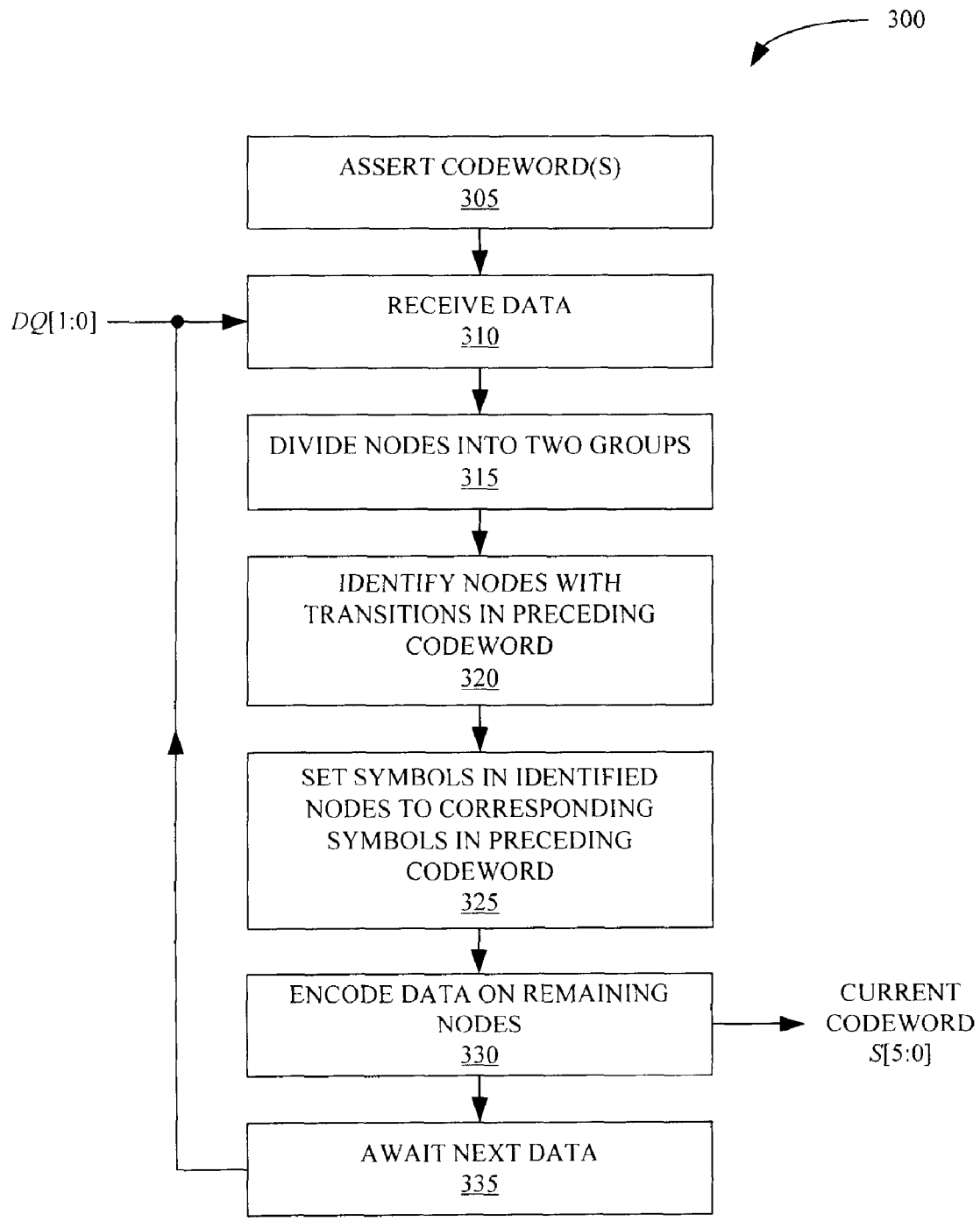
FIG. 3A is a flowchart depicting the operation of the encoder of FIG. 1 in accordance with one embodiment.

FIG. 3A presents a flowchart 300 depicting the operation of encoder 118 (FIG. 1). Before encoding data, in operation 305 encoder 118 (FIG. 1) asserts one codeword having transitions on predetermined nodes (or a predetermined sequence) on channel 114 (FIG. 1) to preset the links to a known state. For example, this can be done prior to sending a packet of data, and can be initiated by optional control logic 122 (FIG. 1). Beginning the encoding sequence at operation 310, current data DQ[1:0] 116 (FIG. 1) is received. Then, encoder 118 (FIG. 1) divides nodes a, b, c, d, e and f of channel 114 (FIG. 1) in operation 315 into two groups of nodes, a first group of nodes having 0s in the previous codeword (such as the codeword asserted in operation 305, and more generally the previously encoded codeword in operation 330) and a second group of nodes having 1s in the previous codeword. For example, if the previous codeword corresponds to time interval T2 in FIG. 2, the first group of nodes are nodes b, e and f and the second group of nodes are nodes a, c and d.

Next, in operation 320, encoder 118 (FIG. 1) identifies one or more nodes in the first group of nodes that had one-to-zero transitions (between the bi-previous codeword and the previous codeword) and one or more nodes in the second group of nodes that had zero-to-one transitions (between the bi-previous codeword and the previous codeword). For example, if the previous codeword corresponds to time interval T2 in FIG. 2, there is a zero-to-one transition on node a and a one-to-zero transition on node f. In operation 325, encoder 118 (FIG. 1) sets the identified one or more nodes in the first group of nodes to have 0s in the current codeword and sets the identified one or more nodes in the second group of nodes to have is in the current codeword (i.e., are unchanged from the previous codeword). Thus, if the current codeword is in time interval T3 in FIG. 2, the symbol on node f is 0 and the symbol node a is 1.

Encoder 118 (FIG. 1) encodes current data DQ[1:0] 116 (FIG. 1) into symbols in the current codeword on the remaining nodes (operation 330), and awaits subsequent data DQ[1:0] 116 (FIG. 1) for the next time interval (operation 335). In particular, current data DQ[1:0] 116 (FIG. 1) is encoded as a fixed number of zero-to-one transitions in the remainder of the first group of nodes, and a fixed number of one-to-zero transitions in the remainder of the second group of nodes. For example, if the current codeword is in time interval T3 in FIG. 2, data 01 is encoded as a zero-to-one transition on node e and a one-to-zero transition on node d. Thus, the current codeword has symbols 101010 on nodes a, b, c, d, e and f. The flow of operations 305 through 335 repeats for data DQ[1:0] 116 (FIG. 1) in each successive time interval.

Figure 3B:
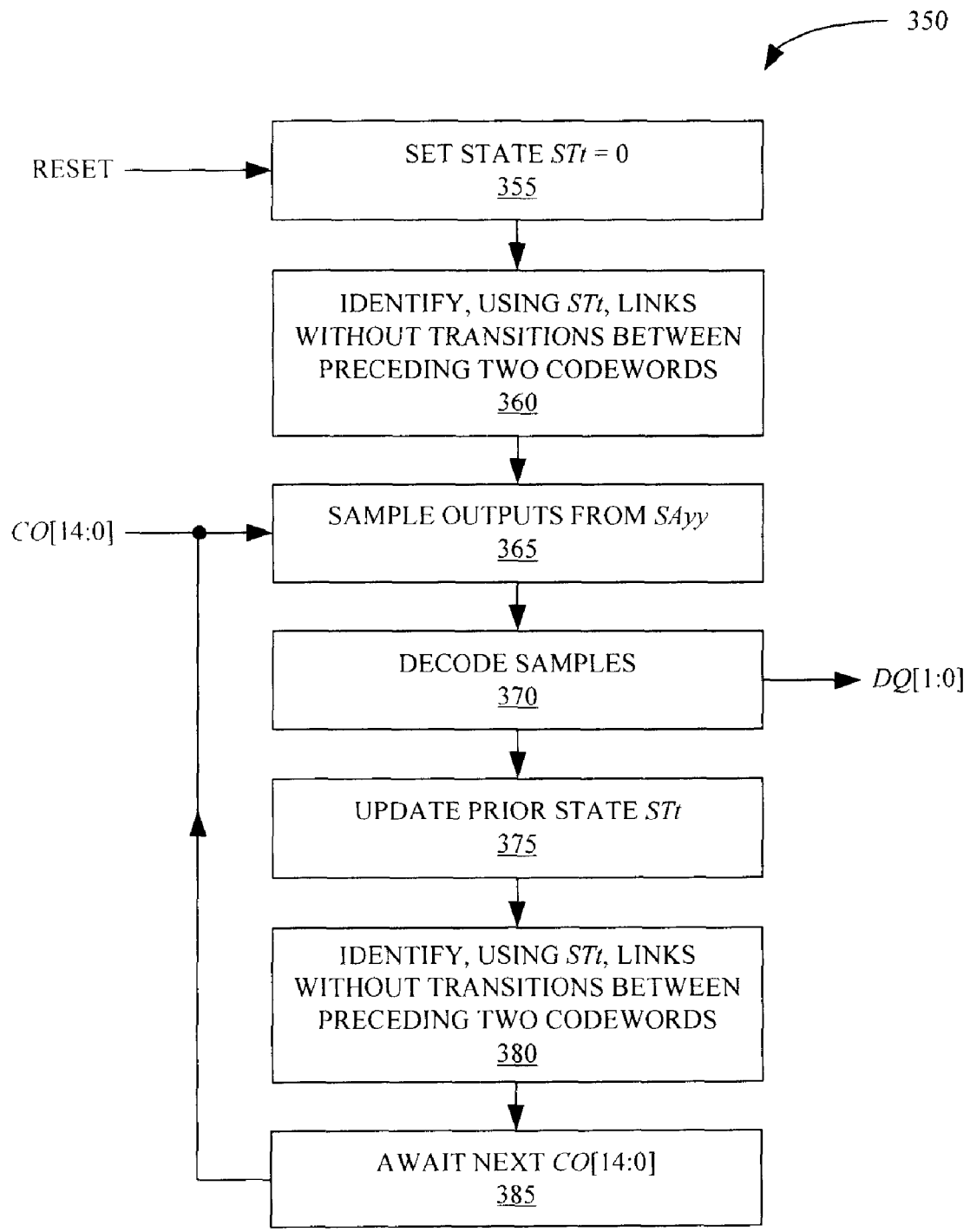
FIG. 3B is a flowchart depicting the operation of decoder and group detector of FIG. 1 in accordance with the decoding technique of Table 1.

FIG. 3B presents a flowchart 350 depicting the operation of decoder 128 (FIG. 1) and state detector 134 (FIG. 1) in accordance with the decoding technique of Table 1. Before decoder 128 (FIG. 1) begins decoding codewords, encoder 118 (FIG. 1) asserts one codeword having transitions on predetermined links (or a predetermined sequence) on channel 114 (FIG. 1) to preset the links to a known state. For example, this can be done prior to sending a packet of data, and can be initiated by optional control logic 122 (FIG. 1). Beginning the decoding sequence at operation 355, reset signal RESET is asserted to set the prior state number STt to zero, which synchronizes the state number with the link state. The reset signal can be asserted by the optional control logic 132 (FIG. 1).

Then, at operation 360, decoder 128 (FIG. 1) uses the prior state number STt to identify which of links a, b, c, d, e and f of channel 114 (FIG. 1) received a pair of like symbols in the preceding time interval and are not excluded based on transitions between the two immediately preceding codewords. For example, with reference to time interval T2 of FIG. 2, sense amplifiers SAab and SAdf, with like inputs and intermediate-voltage Vint output in the preceding time interval T1, can be used to decode the codeword at time interval T2.

Decoder 128 (FIG. 1) receives the outputs from comparison circuit 126 (FIG. 1) as a series of fifteen-symbol sets CO[14:0] (FIG. 1). Decoder 128 (FIG. 1) samples the outputs from at least sense amplifiers SAyy for each codeword (operation 365) and decodes them to produce the encoded data DQ[1:0] 130 (FIG. 1). For example, with reference to time interval T2 of FIG. 2, the sense amplifiers SAyy are SAab and SAdf. The outputs from sense amplifiers SAab and SAdf, respectively CO[14] and CO[1], are 1 and 1 in interval T2. The values of nodes a, b, d and f specified by these outputs (plus the values of nodes c and e from the preceding codeword), i.e., a codeword of 101100, happens after the two immediately preceding codewords when data DQ[1:0] 116 (FIG. 1) is 11 (or a data value of 3), so decoder 128 (FIG. 1) interprets the 11 outputs from sense amplifiers SAab and SAdf to mean that data DQ[1:0] 130 (FIG. 1) is to equal 11 at operation 370.

Decoder 128 (FIG. 1) knows the current codeword and the nodes that have transitions from the decoding of operation 370, and uses this to update the value of the state number STt (operation 375). Then, decoder 128 (FIG. 1) uses the updated prior state number STt to identify which of links a, b, c, d, e and f received a pair of like symbols in the current codeword and are not excluded based on transitions between the two immediately preceding codewords (operation 380), and awaits the next set of symbols CO[14:0] from the sense amplifiers (operation 385). The flow of operations 355 through 385 repeats for each successive codeword.

A property of the encoding/receiving technique illustrated using the embodiment of Table 1 is that eye diagrams from the identified sense amplifiers SAyy that received two like-symbols in the preceding two time intervals, and that did not transition between those intervals, are far wider than those associated with differential links. This is because the outputs from the identified sense amplifiers SAyy transition from intermediate level Vint to ±Vp, whereas the output from sense amplifiers in differential links typically have a larger transition between voltages −Vp and +Vp.

Figure 4A:
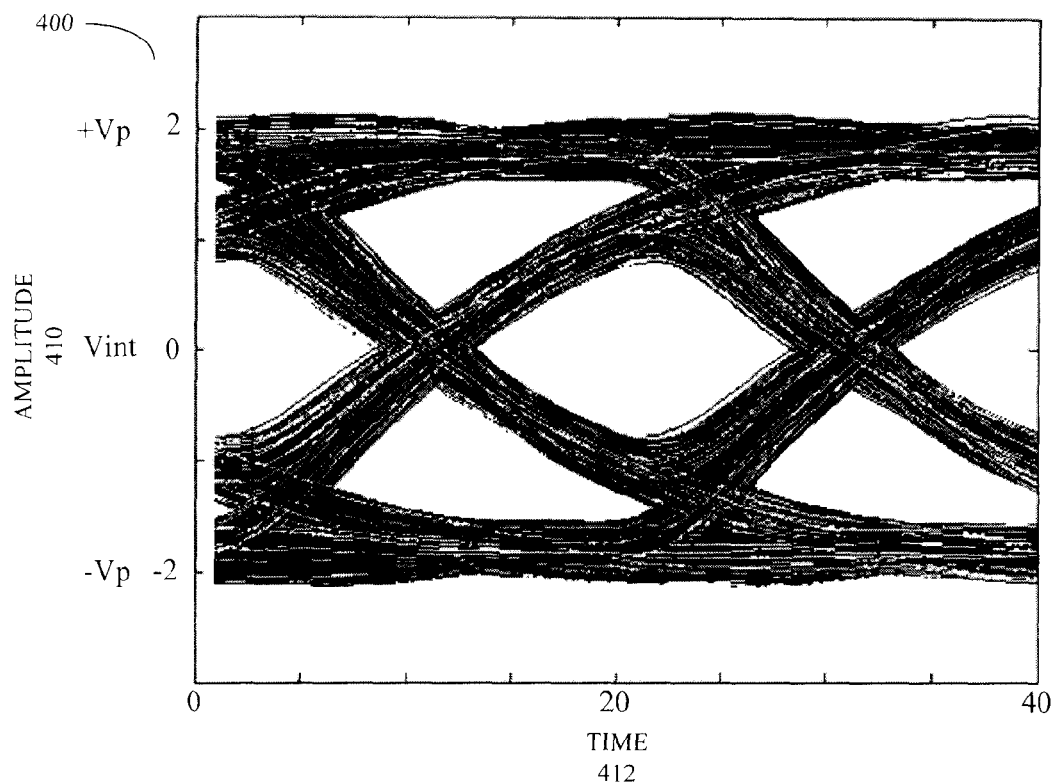
FIG. 4A is a graph illustrating an eye pattern, plotted as amplitude versus time, for differential signaling.
Figure 4B:
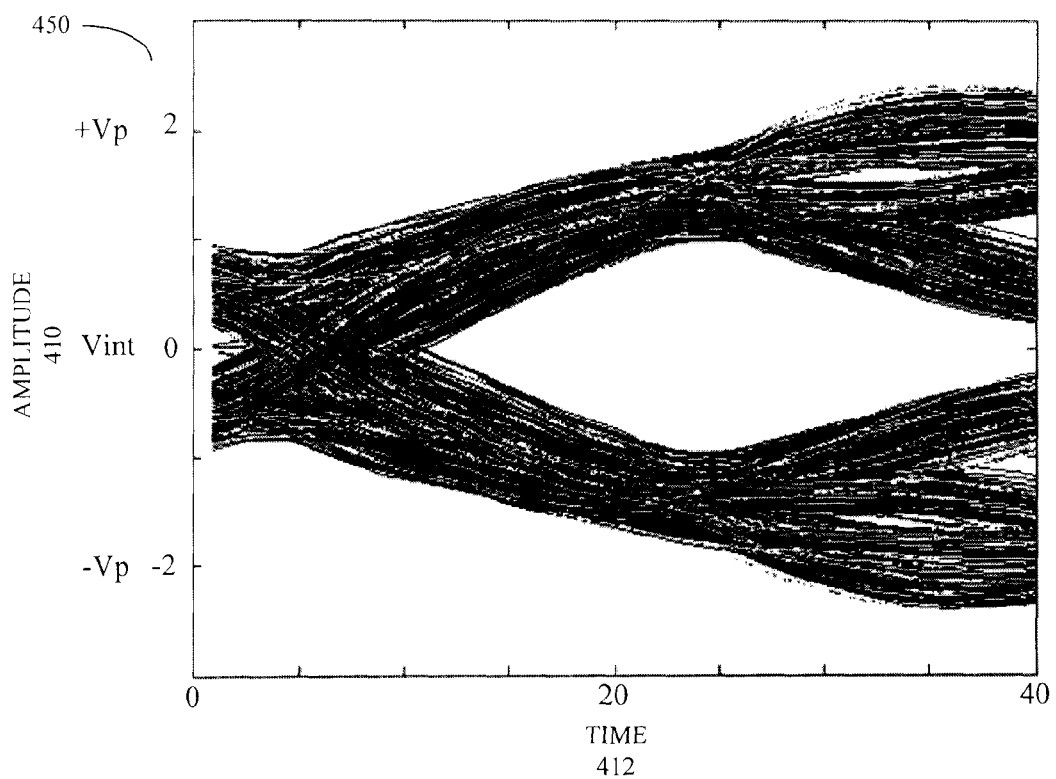
FIG. 4B is a graph illustrating an eye pattern for the 2-6 encoding/receiving technique detailed in connection with FIGS. 1-3.

FIG. 4A presents a graph 400 illustrating an eye pattern, plotted as amplitude 410 versus time 412. FIG. 4B presents a similar graph 450 illustrating an eye pattern for the 2-6 encoding/receiving technique detailed in connection with FIGS. 1-3 on a similar channel. The eye pattern in graph 450 has dramatically larger timing margin than the eye pattern in graph 400. The width of the eye pattern is approximately 100% larger than that of graph 400, which allows the data rate or the bandwidth per wire to be increased by up to 2× with comparable performance (such as the same bit-error rate) at the receiver. This results in a 33% increase in throughput, which translates into 33% more bandwidth per wire relative to differential signaling. Consequently, systems that use the 2-6 encoding technique may operate 2× faster, thereby effectively achieving a data rate associated with 4-6 encoding. This increased data rate allows two consecutive symbols in temporally adjacent codewords to be concatenated into a larger symbol. These concatenated symbols correspond to a higher wire efficiency and lower cross-talk than may be achieved with differential signaling. For example, for 2-6, 3-8, and 4-10 encoding, the wire efficiency with concatenated symbols is 30, 50, and 60% higher, respectively, than differential signaling. Additionally, for 2-6, 3-8, and 4-10 encoding, the cross-talk is ⅓, ¼, and ⅕ (versus ½ for differential signaling) because the average number of transitions per link with concatenated symbols is reduced relative to differential signaling.

Errors can propagate due to the reliance of decoder 128 (FIG. 1) on correct resolution of the preceding codeword. A variety of techniques may be helpful in limiting error propagation, including: communicating data 116 (FIG. 1) in a data packet of bounded size; periodic or as-needed transmission of a predetermined sequence of symbol sets; and/or the use of error detection and/or error correction codes. The predetermined sequence of symbol sets may include: a known pattern or a low data-rate pattern. In some embodiments, state detector 134 (FIG. 1) detects or corrects errors in the determination of the state. For example, errors may be detected and/or corrected based on inputs to and/or outputs from the sense amplifiers (FIG. 1). In some embodiments, optional control logic 122 and 132 (FIG. 1) can initiate remedial action and/or adjustments using, e.g., an auto-negotiation technique. During this auto-negotiation technique, a receive circuit in one of the components (e.g., receiver 112 in FIG. 1) may provide feedback to a transmit circuit in another component (such as on transmitter 110 in FIG. 1) on the efficacy of any changes to the signals on a given sub-channel or on the state of the channel (e.g., channel 14 in FIG. 1). Based on this feedback, the transmit circuit may further modify these signals, e.g., may perform the remedial action.

Figure 5:
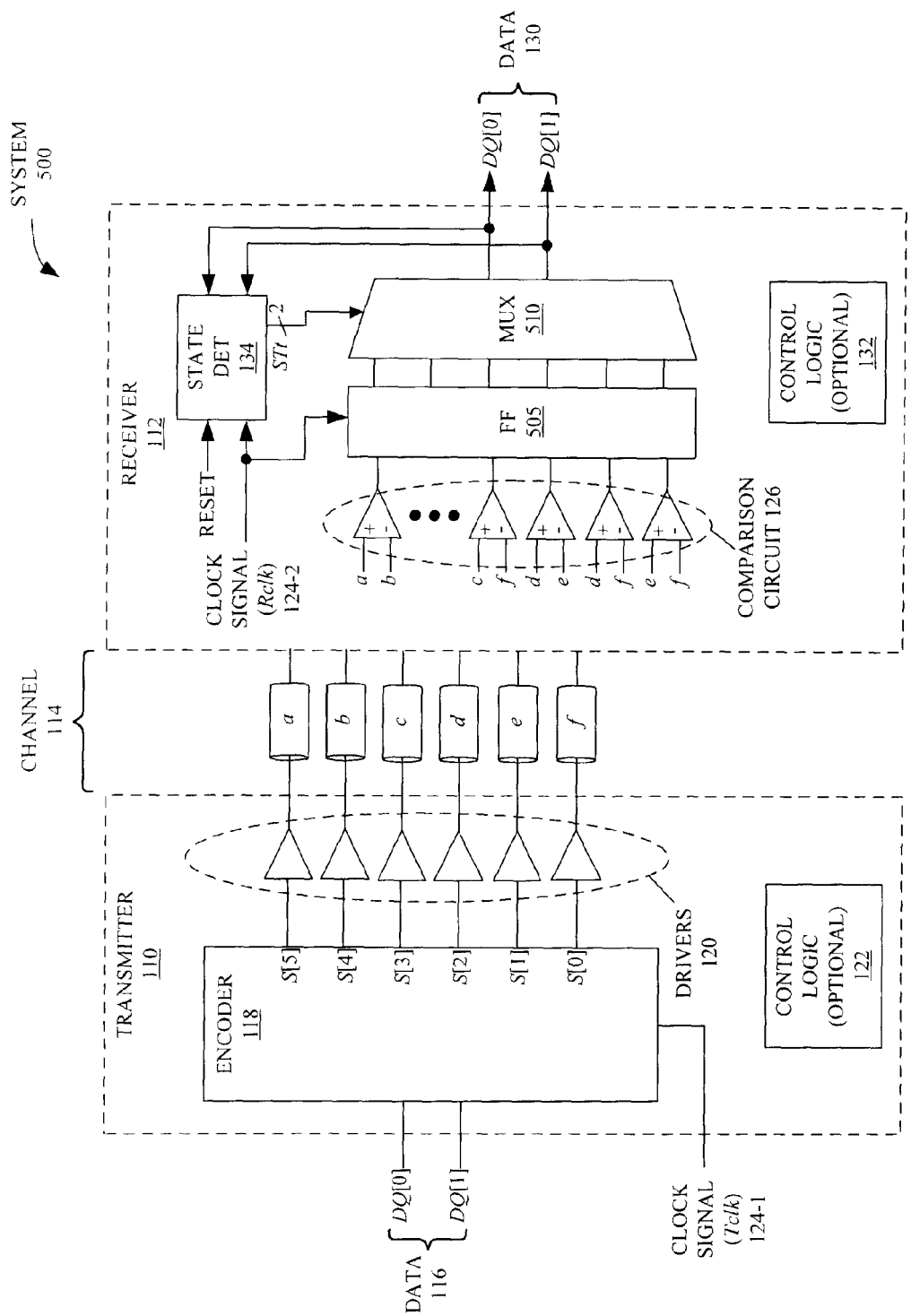
FIG. 5 is a block diagram illustrating a system in accordance with another embodiment.

FIG. 5 depicts a system 500 in accordance with another embodiment. System 500 is similar to system 100 of FIG. 1, with like-identified elements being the same or similar. The function of decoder 128 of FIG. 1 is accomplished using a combination of a flip-flip 505 (or a one-bit analog-to-digital converter) and a multiplexer 510. Flip-flop 505 samples the outputs of comparison circuit 126 and multiplexer 510 selects a pair of sense amplifiers SAyy (FIG. 2) for each time interval based upon the prior state STt identified by state detector 134.

Figure 6:
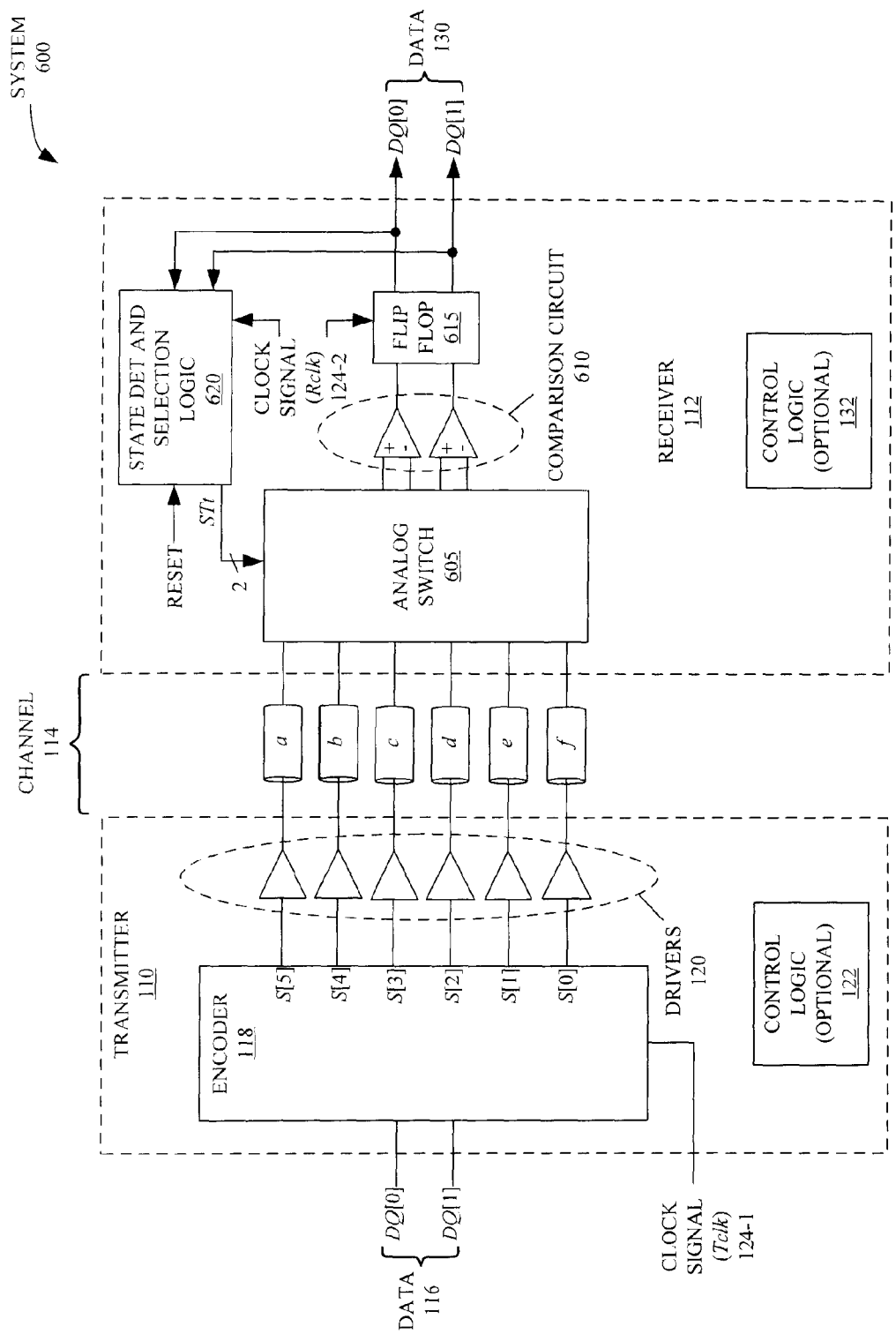
FIG. 6 is a block diagram illustrating a system in accordance with another embodiment.

FIG. 6 depicts a system 600 in accordance with another embodiment. System 600 is similar to system 100 of FIG. 1, with like-identified elements being the same or similar. The functions of decoder 128 and state detector 134 of FIG. 1 are accomplished using a combination of an analog switch 605 (such as a sample and hold, or a multiplexer), a comparison circuit 610 with two sense amplifiers, a flip-flop 615, and state detection and selection logic 620. State detection and selection logic 620 tracks the prior state STt, as in prior embodiments, and directs analog switch 605 to connect two pairs to nodes to the inputs of the two sense amplifiers in comparison circuit 610. Then, flip flop 615 captures the outputs from the sense amplifiers. The node selection of state detection and selection logic 620 couples the identified pairs of nodes (FIG. 2) expressing two 0s in the preceding time interval to one sense amplifier and the other identified pair of nodes (FIG. 2) expressing two 1s in the preceding time interval to the other sense amplifier. Therefore, the two sense amplifiers act as sense amplifiers SAyy of prior examples.

Figure 7:
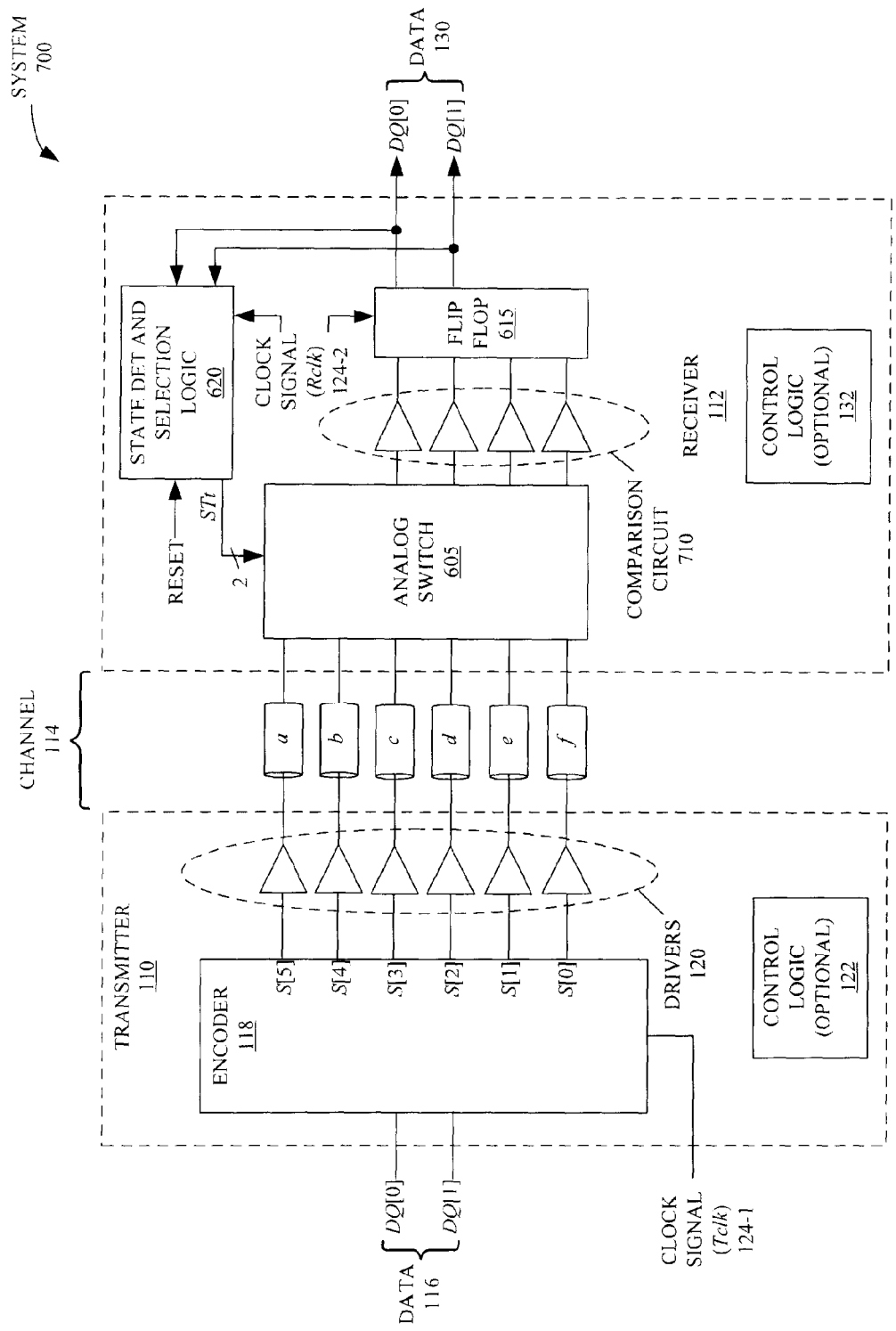
FIG. 7 is a block diagram illustrating a system in accordance with another embodiment.

FIG. 7 depicts a system 700 in accordance with another embodiment. System 700 is similar to system 600 of FIG. 6, with like-identified elements being the same or similar. The two differential sense amplifiers in comparison circuit 610 (FIG. 6) are accomplished using four single-ended amplifiers in comparison circuit 710. Single-ended amplifiers may also be used in the other prior examples.

The foregoing embodiments employ the outputs from two or four sense amplifiers to decode data. Other embodiments decode data by considering additional sense-amplifier outputs. For example, the decoder can sample all available sense-amplifier outputs over a number of time intervals and apply the resulting samples to a trellis to determine the most probable data sequence. Viterbi decoding is one well-known algorithm for finding a most probable trellis-encoded data sequence. Alternatively, the decoder may be implemented as a finite state machine.

Figure 8:
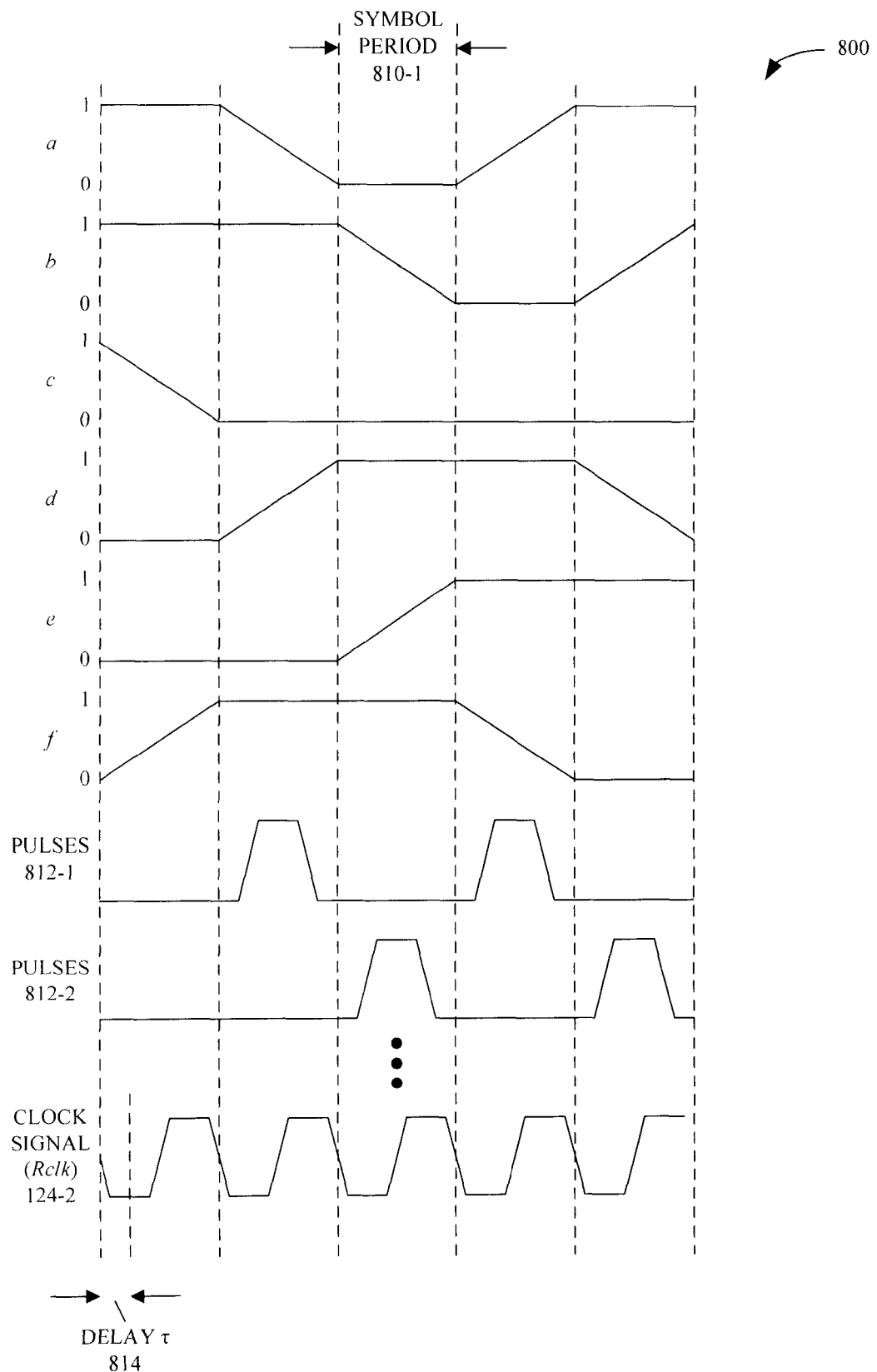
FIG. 8 is a waveform diagram illustrating the recovery of an embedded clock signal in accordance with another embodiment.

In the foregoing embodiments, clock signal (Rclk) 124-2 (FIGS. 1 and 5-7) can be provided using a clock-forwarding link. Alternatively, it may be recovered from the symbols transmitted on the links using embedded clock recovery. This is illustrated in FIG. 8, which presents a waveform diagram 800 illustrating the recovery of embedded clock signal (Rclk) 124-2. In this waveform diagram, vertical dashed lines indicate sampling times and adjacent pairs of vertical dashed lines denote a symbol period, such as symbol period 810-1. During each symbol period, the six symbols on links a-f are associated with a codeword. (In agreement with the encoding technique, note that transitions on a given link do not occur in adjacent time intervals.) Because there are two transitions per codeword, pulses 812 may be extracted from these symbols, and clock signal (Rclk) 124-2 may be recovered by delaying (by delay τ 814) and combining the pulses 812. This combination is approximately independent of intersymbol interference on links a-f. Jitter in recovered clock signal (Rclk) 124-2 is determined by transmitter 110 (FIG. 1).

Figure 9:
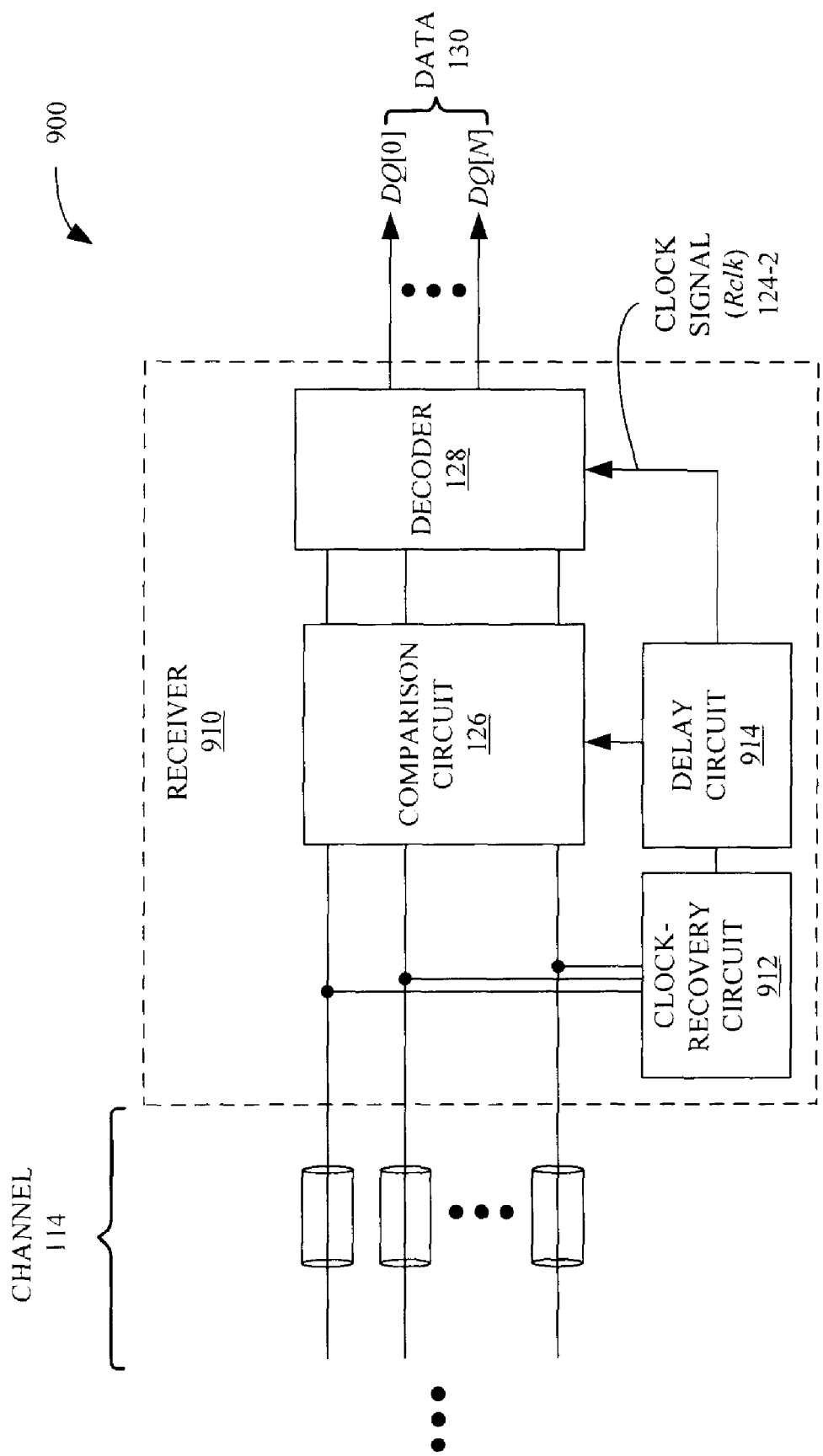
FIG. 9 is a block diagram illustrating a receiver in accordance with another embodiment.
Figure 10:
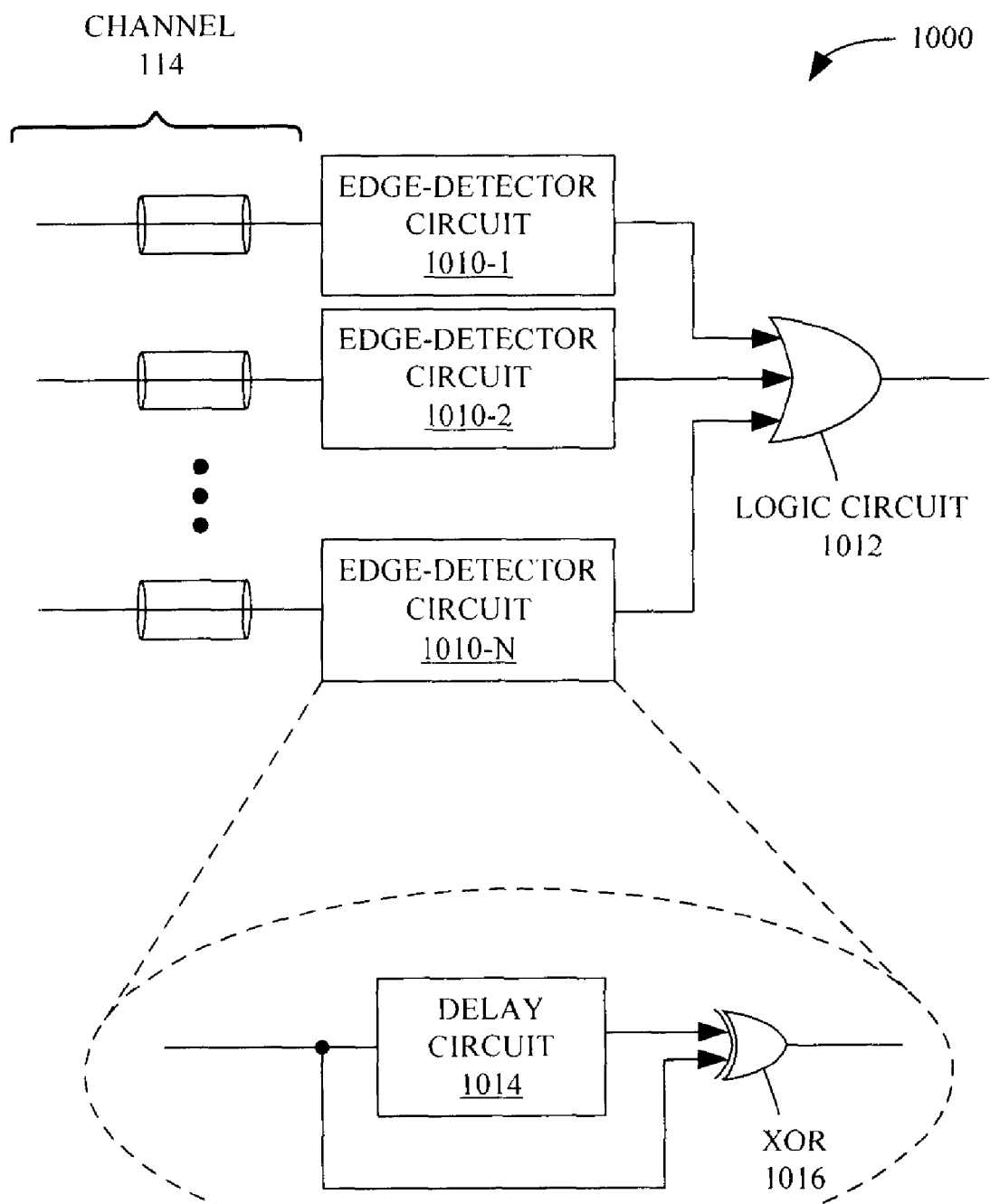
FIG. 10 is a block diagram illustrating a clock-recovery circuit in the receiver of FIG. 9 in accordance with another embodiment.

FIG. 9 depicts a receiver 910 the recovers clock signal (Rclk) 124-2 from the symbols in the codewords on the links using clock-recovery circuit 912 and delay circuit 914. As depicted in FIG. 10, a clock-recovery circuit 1000 in receiver 910 (FIG. 9) may include edge-detection circuits 1010 and a logic circuit 1012 (such as OR logic) that combines pulses output from the edge-detection circuits 1010 to provide the clock signal. Each of these edge-detection circuits 1010 may be implemented using a delay circuit 1014 and XOR logic 1016 to extract pulses from the transitions on a link during a symbol period.

As shown in FIG. 9, after recovery, clock signal (Rclk) 124-2 may be conditioned. For example, clock signal (Rclk) 124-2 may be filtered (using a low-pass filter or an integrator). In addition, delay circuit 914 may correct for skew, duty-cycle or both. During the initialization of the state of channel 114, the predetermined sequence (such as a constant frequency pattern) may include an embedded clock signal that allows clock-recovery circuit 912 to acquire and lock onto clock signal (Rclk) 124-2.

There may be more than one instance of receiver 910. If each of the instances separately recovers a local clock signal from the received codewords, it may not be necessary to match the lengths of the links in the different instances. However, if these instances share a common clock signal (Rclk) 124-2, the instances may operate at lower data rates. For example, two instances of receiver 910 may each operate at half the rate of a system clock (e.g., using double date rate), thereby allowing one instance to operate on even codewords and even data (e.g., data in a first half period), and the other instance to operate on odd codewords and odd data (e.g., data in a second half period). Consequently, in these embodiments clock signal (Rclk) 124-2 may have a period that is twice that of the system clock.

In the foregoing description and in the accompanying drawings, specific terminology and drawing symbols are set forth to provide a thorough understanding of the present invention. In some instances, the terminology and symbols may imply specific details that are not required to practice the invention. For example, embodiments of the invention may be adapted for use with multi-pulse-amplitude-encoded (multi-PAM) signals.

An output of a process for designing an integrated circuit, or a portion of an integrated circuit, comprising one or more of the circuits described herein may be a computer-readable medium such as, for example, a magnetic tape, or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer-readable medium. Those of skill in the art of integrated circuit fabrication can use such encoded data to fabricate integrated circuits comprising one or more of the circuits described herein.

While the present invention has been described in connection with specific embodiments, the claims are not limited to what is shown. For example, the foregoing embodiments depict a 2-6 encoding technique. More generally, embodiments can support N-to-M encoding, where M is greater than N and is at least six. For example, N may be 2 and M may be 6, N may be 3 and M may be 8, or N may be 4 and M may be 10. In general, for a system with 2n links, there are transitions in one out of (n−1) zeros and one out of (n−1) ones in a codeword. Thus, for the current codeword, there are (n−1)×(n−1) possible symbol combinations, or 4, 9, and 16 symbol combinations for 2-6, 3-8, and 4-10 encoding, respectively. If decoder 128 (FIG. 1) divides the links into two sets, one of which includes links that had 0s in the preceding codeword, and the other which includes links that had 1s in the preceding codeword, then because of the coding constraints that there are only two transitions between temporally adjacent codewords and that each link does not have transitions in consecutive pairs of codewords, the current codeword may be decoded using (n/2−1)×(n/2−2) differential sense amplifiers. For example, for 2-6 encoding, the current codeword may be decoded using two differential sense amplifiers (one per set).

The N-symbol data can be represented using all or a subset of possible N-symbol values. Furthermore, the embodiments detailed above can be replicated and/or combined to support different input data widths (e.g., two 4-10 encoders can be logically combined to convey eight-bit data over twenty links). Moreover, some components are shown directly connected to one another while others are shown connected via intermediate components. In each instance the method of interconnection, or 'coupling,' establishes some desired electrical communication between two or more circuit nodes, or terminals. Such coupling may often be accomplished using a number of circuit configurations, as will be understood by those of skill in the art. For example, the foregoing codespaces provide balanced signaling, and support AC-coupled links. Other embodiments can be unbalanced, include DC-coupled links, or both. Therefore, the spirit and scope of the appended claims should not be limited to the foregoing description. Only those claims specifically reciting "means for" or "step for" should be construed in the manner required under the sixth paragraph of 35 U.S.C. §112.

What is claimed is:

1. A method of encoding N-symbol data patterns into consecutive M-symbol codewords, where M is greater than N, the method comprising:
for groups of three temporally adjacent ones of the M-symbol codewords, including for each of a series of adjacent time intervals, a current codeword in a current time interval, a preceding codeword immediately preceding the current codeword in a preceding time interval, and a bi-preceding codeword immediately preceding the preceding codeword in a bi-preceding time interval:
dividing a set of signal nodes into a first group of signal nodes having symbols of a first symbol type in the preceding codeword and a second group of signal nodes having symbols of a second symbol type in the preceding codeword;
identifying one or more first signal nodes in the first group of nodes having one or more first symbol transitions from the second symbol type to the first symbol type between the bi-preceding codeword and the preceding codeword, and one or more second signal nodes in the second group of signal nodes having one or more second symbol transitions from the first symbol type to the second symbol type between the bi-preceding codeword and the preceding codeword;
setting the symbol type of symbols on the one or more first signal nodes in the current codeword to the first symbol type and the symbol type of symbols on the one or more second signal nodes in the current codeword to the second symbol type; and
encoding a current N-symbol pattern into symbols in the current codeword, the current codeword expressed as one or more second symbol transitions on a remainder of the first group of signal nodes which excludes the one or more first signal nodes, and one or more first symbol transitions on a remainder of the second group of signal nodes which excludes the one or more second signal nodes.

2. The method of claim 1, wherein the first symbol type is representative of a logic zero and the second symbol type is representative of a logic one; and
wherein the equal numbers of the first symbol type and the second symbol type in each codeword.

3. The method of claim 1, wherein there are a fixed number of first symbol transitions between adjacent codewords and a fixed number of second symbol transitions between adjacent codewords.

4. The method of claim 3, wherein the number of first symbol transitions equals the number of second symbol transitions.

5. An integrated circuit comprising:
an encoder having multiple encoder output terminals, the encoder to encode data into a sequence of consecutive codewords, each codeword expressed as a first set of symbols of a first symbol type on a first set of the encoder output terminals and a second set of symbols of a second symbol type on a second set of the encoder output terminals; wherein symbol transitions between a current codeword and an immediately subsequent codeword occur on a first subset of the encoder output terminals;
wherein symbol transitions between the subsequent codeword and an immediately following codeword occur on a second subset of the encoder output terminals, which is different that the first subset of the encoder output terminals; and wherein symbols on the first subset of the encoder output terminals are unchanged between the subsequent codeword and the immediately following codeword.

6. The integrated circuit of claim 5, wherein the first symbol type is representative of a logic zero and the second symbol type is representative of a logic one.

7. The integrated circuit of claim 5, wherein the symbol transitions between adjacent codewords include one or more first symbol transitions from the first symbol type to the second symbol type and one or more second symbol transitions from the second symbol type to the first symbol type.

8. The integrated of claim 7, wherein there are a fixed number of first symbol transitions between adjacent codewords and a fixed number of second symbol transitions between adjacent codewords.

9. The integrated circuit of claim 8, wherein the number of first symbol transitions equals the number of second symbol transitions.

10. The integrated circuit of claim 5, wherein, during an initialization operation mode, the encoder circuit outputs a predetermined sequence of one or more consecutive codewords on the encoder output terminals.

11. An integrated circuit comprising:
input nodes to receive a series of parallel symbols sets over a series of time intervals, including a current symbol set in a current time interval, a preceding symbol set in an immediately preceding time interval, and a bi-preceding symbol set in a bi-preceding time interval immediately preceding the preceding time interval; wherein each symbol in the symbol sets represents one of multiple symbol values;
comparison circuits, each comparison circuit having first and second input terminals, coupled to respective ones of a pair of the input nodes to receive the symbols, and a comparison-circuit output node to provide comparison results; and
a decoder having decoder input terminals, each decoder input terminal coupled to a respective one of the comparison-circuit output nodes; wherein the decoder identifies which of the comparison circuits provided comparison results corresponding to symbol transitions between the bi-preceding symbol set and the preceding symbol set; and
wherein the decoder decodes the current symbol set using comparison results from other comparison circuits than the identified comparison circuits, which provide comparison results corresponding to symbol transitions between the preceding symbol set and the current symbol set.

12. The integrated circuit of claim 11, wherein the other comparison circuits provide comparison results for at least two pairs of input nodes.

13. The integrated circuit of claim 11, wherein the first and second input terminals of the other comparison circuits received symbols having the same symbol values in the preceding time interval.

14. The integrated circuit of claim 11, wherein the multiple symbol values include a first symbol value representative of a logic zero and a second symbol value representative of a logic one; and
wherein there are equal numbers of the first symbol value and the second symbol value in each symbol set.

15. The integrated circuit of claim 14, wherein, between adjacent symbol sets, there are an equal number of one or more first symbol transitions from the first symbol value to the second symbol value and one or more second symbol transitions from the second symbol value to the first symbol value.

16. The integrated circuit of claim 11, wherein the decoder decodes each symbol set of the parallel symbol sets into corresponding data; and
wherein the decoder decodes a respective symbol sets into the corresponding data depending upon the preceding codeword and nodes that had symbol transitions between the bi-preceding codeword and the preceding codeword.

17. The integrated circuit of claim 16, wherein the integrated circuit further comprises a state detector to identify the preceding codeword and nodes that had symbol transitions between the bi-preceding codeword and the preceding codeword.

18. The integrated circuit of claim 11, further comprising a clock-recovery circuit to recover a clock signal embedded in the symbol sets over the series of time intervals.

19. A method of decoding a sequence of parallel codewords, each codeword including symbols of a first symbol type and symbols of a second symbol type, the method comprising:
receiving a first of the codewords on nodes;
receiving a second of the codewords on the nodes;
identifying a first set of the nodes expressing symbol transitions between the first of the codewords and the second of the codewords;
receiving a third of the codewords on the nodes;
comparing at least two pairs of symbols on a second set of the nodes, which is different than the first set of the nodes, to produce second comparison results; wherein at least two of the second set of nodes express symbol transitions between the second of the codewords and the third of the codewords; and
decoding the third of the codewords based on the second comparison results.

20. The method of claim 19, further comprising:
comparing at least two pairs of symbols on the first set of the nodes to produce first comparison results; and
decoding the second of the codewords based on the first comparison results;
wherein the decoding of the third of the codewords is based on the second of the codewords.

21. The method of claim 19, wherein symbols received on the first set of nodes are ignored during the decoding of the third of the codewords.

22. The method of claim 19, wherein the second set of the nodes corresponding to a respective one of the at least two pairs of symbols receive symbols of the same symbol type in the second of the codewords.

23. An integrated circuit comprising:
input nodes to receive a series of parallel symbols sets over a series of time intervals, including a current symbol set in a current time interval, a preceding symbol set in an immediately preceding time interval, and a bi-preceding symbol set in a bi-preceding time interval immediately preceding the preceding time interval; wherein each symbol in the symbol sets represents one of multiple symbol values;
comparison circuits, each comparison circuit having first and second input terminals, coupled to respective ones of a pair of the input nodes to receive the symbols, and a comparison-circuit output node to provide comparison results; and
means for identifying, for each current time interval, which of the comparison circuits provided comparison results corresponding to symbol transitions between the bi-preceding symbol set and the preceding symbol set, and for decoding the current symbol set using comparison results from other comparison circuits than the identified comparison circuits, which provide comparison results corresponding to symbol transitions between the preceding symbol set and the current symbol set.

24. A system comprising:
a first integrated circuit that includes an encoder having multiple encoder output terminals, the encoder to encode data into a sequence of consecutive codewords, each codeword expressed as a first set of symbols of a first symbol type on a first set of the encoder output terminals and a second set of symbols of a second symbol type on a second set of the encoder output terminals; wherein symbol transitions between a current codeword and an immediately subsequent codeword occur on a first subset of the encoder output terminals; wherein symbol transitions between the subsequent codeword and an immediately following codeword occur on a second subset of the encoder output terminals, which is different that the first subset of the encoder output terminals; and wherein symbols on the first subset of the encoder output terminals are unchanged between the subsequent codeword and the immediately following codeword; and
a second integrated circuit having:
input nodes to receive a series of parallel symbols sets, corresponding to the consecutive codewords, over a series of time intervals, including a current symbol set in a current time interval, a preceding symbol set in an immediately preceding time interval, and a bi-preceding symbol set in a bi-preceding time interval immediately preceding the preceding time interval; wherein each symbol in the symbol sets represents one of multiple symbol values;
comparison circuits, each comparison circuit having first and second input terminals, coupled to respective ones of a pair of the input nodes to receive the symbols, and a comparison-circuit output node to provide comparison results; and
a decoder having decoder input terminals, each decoder input terminal coupled to a respective one of the comparison-circuit output nodes; wherein the decoder identifies which of the comparison circuits provided comparison results corresponding to symbol transitions between the bi-preceding symbol set and the preceding symbol set; and
wherein the decoder decodes the current symbol set using comparison results from other comparison circuits than the identified comparison circuits, which provide comparison results corresponding to symbol transitions between the preceding symbol set and the current symbol set.

25. A method of encoding a sequence of data patterns into consecutive M-symbol codewords, each codeword expressed in parallel as M logic-zero and logic-one signal levels on M respective signal nodes, the method comprising:

for each consecutive group of three temporally adjacent ones of the codewords on the signal nodes, each group of three including a current codeword in a current time interval, a preceding codeword immediately preceding the current codeword in a preceding time interval, and a bi-preceding codeword immediately preceding the preceding codeword in a bi-preceding time interval, encoding one of the data patterns into the current codeword by:
maintaining a state indicative of the ones of the signal nodes that transitioned to either the logic-zero or logic-one signal level between the bi-preceding codeword and the preceding codeword;
preventing the ones of the signal nodes that transitioned to either the logic-zero or logic-one signal level between the bi-preceding codeword and the preceding codeword from transitioning between the preceding codeword and the current codeword; and
encoding the one of the data patterns as transitions between the signal levels on ones of the signal nodes that did not transition between the signal levels from the bi-preceding codeword to the preceding codeword.

26. The method of claim 25, wherein the signal nodes express the preceding codeword as logic-zero signal levels on a first subset of the signal nodes and logic-one signal levels on a second subset of the signal nodes; and
wherein each of the first and second subsets of signal nodes includes a least one transition between the signal levels between the preceding codeword and the current codeword.

27. A method of decoding a sequence of M-symbol codewords, each codeword expressed in parallel as M logic-zero and logic-one signal levels on M respective signal nodes, the method comprising:
for each consecutive group of three temporally adjacent ones of the codewords on the signal nodes, each group of three including a current codeword in a current time interval, a preceding codeword immediately preceding the current codeword in a preceding time interval, and a bi-preceding codeword immediately preceding the preceding codeword in a bi-preceding time interval, decoding data from the current codeword by:
maintaining a state indicative of the ones of the signal nodes that did not transition to either the logic-zero or logic-one signal level between the bi-preceding codeword and the preceding codeword;
identifying, based upon the state, pairs of the ones of the signal nodes that did not transition between the bi-preceding and preceding codewords;
comparing the signal levels on the identified pairs of the signal nodes to produce comparison results; and
decoding the data from the comparison results.

28. The method of claim 27, wherein the identified pairs of the signal nodes were of like single levels in the preceding codeword.

29. The method of claim 28, wherein the identified pairs of the signal node where of like signal levels in the bi-preceding codeword.

* * * * *